US010572362B2

(12) United States Patent
Klein et al.

(10) Patent No.: US 10,572,362 B2
(45) Date of Patent: *Feb. 25, 2020

(54) ON-SITE VISUALIZATION OF COMPONENT STATUS

(71) Applicant: INTERNATIONAL BUSINESS MACHINES CORPORATION, Armonk, NY (US)

(72) Inventors: Arnon H. Klein, Ganey Tikva (IL); Nadav Parag, Rehovot (IL); Tamir Riechberg, Hod-HaSharon (IL); Moshe Weiss, Petah Tiqwa (IL); Yinon Yamin, Kiryatono (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 134 days.

This patent is subject to a terminal disclaimer.

(21) Appl. No.: 15/841,736

(22) Filed: Dec. 14, 2017

(65) Prior Publication Data

US 2018/0113778 A1 Apr. 26, 2018

Related U.S. Application Data

(63) Continuation of application No. 13/797,013, filed on Mar. 12, 2013, now Pat. No. 9,959,190.

(51) Int. Cl.
*G06F 11/32* (2006.01)
*H04L 12/26* (2006.01)
(Continued)

(52) U.S. Cl.
CPC .......... *G06F 11/327* (2013.01); *G06F 11/006* (2013.01); *G06F 11/3034* (2013.01);
(Continued)

(58) Field of Classification Search
CPC .. G06F 11/327; G06F 11/006; G06F 11/3034; G06F 11/32; G06F 11/324;
(Continued)

(56) References Cited

U.S. PATENT DOCUMENTS 5,966,510 A 10/1999 Carbonneau et al.
6,297,962 B1 10/2001 Johnson et al.
(Continued)

OTHER PUBLICATIONS

Coleman, "QR Codes: What Are They and Why Should You Care?," CULS Proceedings, vol. 1, 2011 (8 pages).

*Primary Examiner* — Paul Contino
(74) *Attorney, Agent, or Firm* — Griffiths & Seaton PLLC

(57) ABSTRACT

Embodiments of the present invention enable a portable computing device such as a smartphone or a tablet computer, to capture one or more codes for one or more corresponding components positioned in proximity to the portable computing device, and to convey the one or more codes to a management system. Upon receiving the one or more codes, the management system can be configured to convey, to the portable computing device, an identification and a status of each of the one or more components. The portable computing device can then present the status of the one or more components on a display, and the one or more components are detected based on a distance of the portable device in relation to the one or more components such that when a plurality of the one or more components are in a field of view of the portable device.

14 Claims, 5 Drawing Sheets

(51) Int. Cl.
*H04L 12/24* (2006.01)
*G06F 11/00* (2006.01)
*G06F 11/30* (2006.01)

(52) U.S. Cl.
CPC ............ *G06F 11/32* (2013.01); *G06F 11/324* (2013.01); *G06F 11/328* (2013.01); *H04L 41/22* (2013.01); *H04L 43/0817* (2013.01); *H04L 41/0677* (2013.01)

(58) Field of Classification Search
CPC .... G06F 11/328; H04L 41/22; H04L 41/0677; H04L 43/0817
See application file for complete search history.

(56) References Cited

U.S. PATENT DOCUMENTS

| | | | |
|---|---|---|---|
| 7,372,451 B2 | 5/2008 | Dempski | |
| 8,559,030 B2 | 10/2013 | Tsongas et al. | |
| 8,621,287 B1 | 12/2013 | Ethington | |
| 8,746,548 B2 | 6/2014 | Terwilliger et al. | |
| 8,913,086 B2 | 12/2014 | Meserth et al. | |
| 8,957,917 B2 | 2/2015 | Meserth et al. | |
| 9,066,192 B2 * | 6/2015 | Earl | H04W 4/50 |
| 9,171,209 B2 | 10/2015 | Townend et al. | |
| 9,329,966 B2 | 5/2016 | Dugan et al. | |
| 9,671,875 B2 | 6/2017 | Miyashita et al. | |
| 2002/0046368 A1 | 4/2002 | Friedrich et al. | |
| 2007/0097419 A1 * | 5/2007 | Mathewson | G03G 15/55 358/1.15 |
| 2007/0294563 A1 | 12/2007 | Bose | |
| 2008/0200153 A1 | 8/2008 | Fitzpatrick et al. | |
| 2010/0039433 A1 | 2/2010 | McGreevy et al. | |
| 2010/0225653 A1 | 9/2010 | Sao et al. | |
| 2010/0306318 A1 | 12/2010 | Fitzpatrick et al. | |
| 2010/0325490 A1 | 12/2010 | Anvin et al. | |
| 2011/0241833 A1 | 10/2011 | Martin et al. | |
| 2011/0289161 A1 | 11/2011 | Rankin, Jr. et al. | |
| 2012/0026530 A1 | 2/2012 | Tsongas et al. | |
| 2012/0131416 A1 | 5/2012 | Dugan et al. | |
| 2012/0191817 A1 | 7/2012 | Sayan | |
| 2012/0249588 A1 | 10/2012 | Tison et al. | |
| 2012/0266258 A1 | 10/2012 | Tuchman et al. | |
| 2012/0303323 A1 | 11/2012 | Ha et al. | |
| 2012/0304089 A1 | 11/2012 | Cohen | |
| 2013/0071029 A1 | 3/2013 | Terwilliger et al. | |
| 2013/0114100 A1 | 5/2013 | Torii et al. | |
| 2013/0120449 A1 | 5/2013 | Ihara et al. | |
| 2013/0128758 A1 | 5/2013 | Polland | |
| 2013/0166969 A1 | 6/2013 | Zhang et al. | |
| 2013/0169996 A1 | 7/2013 | McLeod et al. | |
| 2013/0207894 A1 | 8/2013 | Miyashita et al. | |
| 2013/0212149 A1 | 8/2013 | Frenz | |
| 2013/0212512 A1 | 8/2013 | Frenz | |
| 2014/0025992 A1 | 1/2014 | Deroos et al. | |
| 2014/0061297 A1 | 3/2014 | Smith et al. | |
| 2014/0074850 A1 | 3/2014 | Noel et al. | |
| 2014/0082430 A1 | 3/2014 | Bartlett et al. | |
| 2014/0085309 A1 | 3/2014 | Czapar | |
| 2014/0089028 A1 | 3/2014 | Marshall et al. | |
| 2015/0169260 A1 | 6/2015 | McLeod et al. | |
| 2015/0370525 A1 * | 12/2015 | Cox | G06F 3/1454 345/667 |
| 2016/0140868 A1 * | 5/2016 | Lovett | G09B 19/0053 434/118 |

* cited by examiner

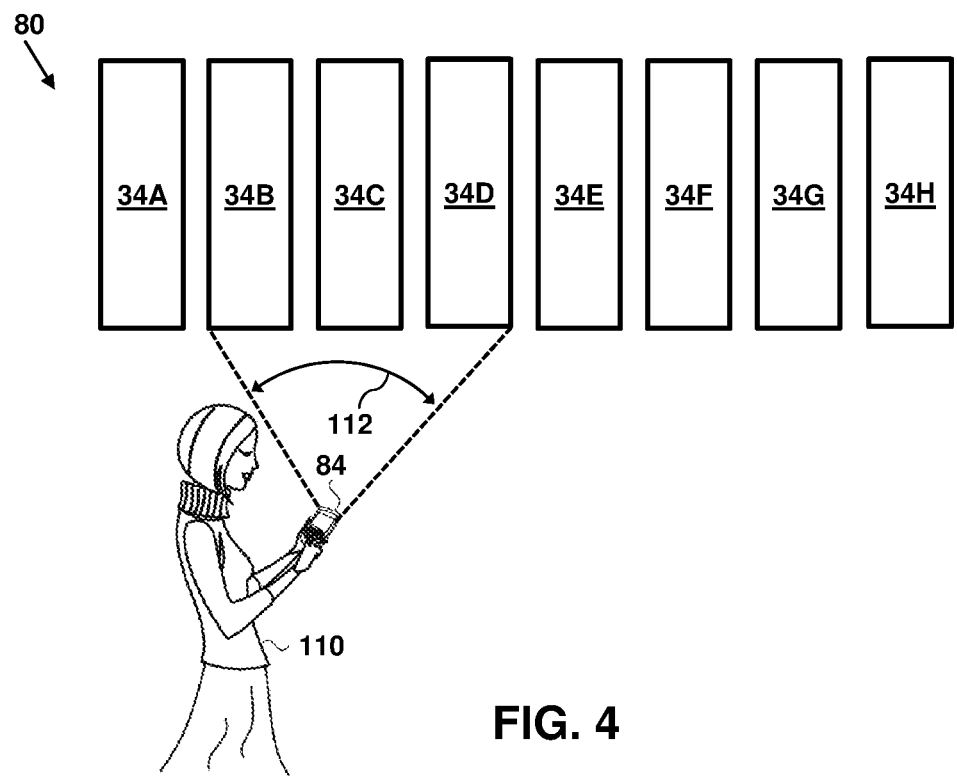
FIG. 4
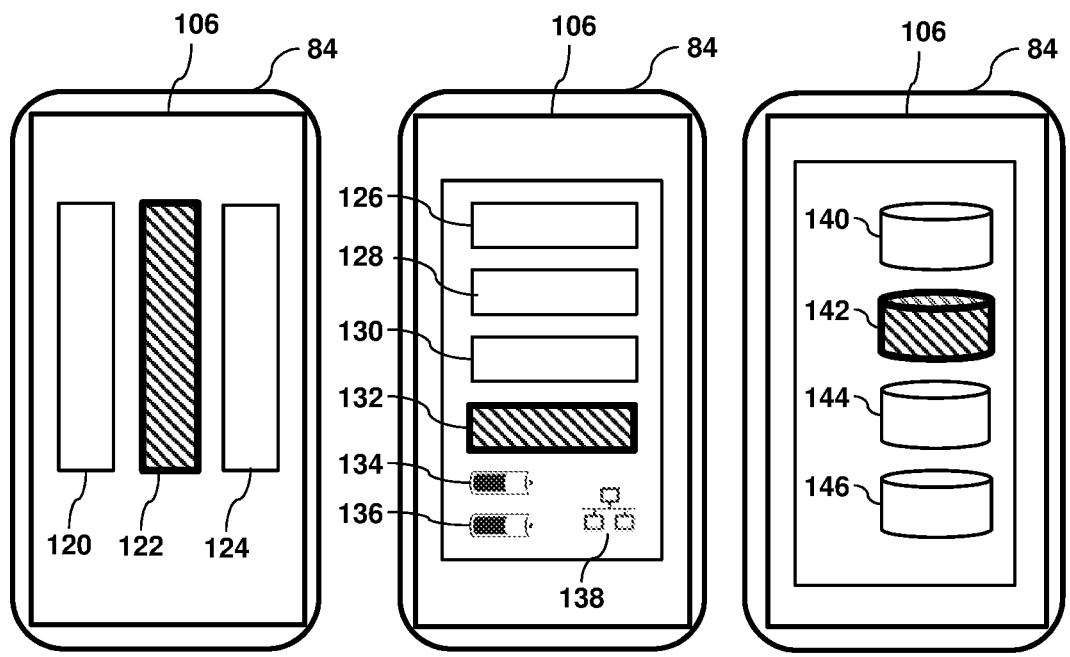
FIG. 5A  FIG. 5B  FIG. 5C

ON-SITE VISUALIZATION OF COMPONENT STATUS

CROSS REFERENCE TO RELATED APPLICATIONS

This Application is a Continuation of U.S. patent application Ser. No. 13/797,013, filed on Mar. 12, 2013.

FIELD OF THE INVENTION

The present invention relates generally to computer systems, and specifically to identifying faulty components in a computing facility.

BACKGROUND

Many portable computing devices such as smartphones are equipped with sensing devices that can be used to identify appropriately labeled items (also referred to herein as components) that are in proximity to the device. For example, a portable computing device may be equipped with an optical sensing module (e.g., a camera) that can be configured to collect identification information from optical machine-readable labels such as bar codes and Quick Response (QR) codes.

Portable computing devices may also be configured to identify items via tags affixed to the items that are configured to convey item identification information via a wireless signal. Examples of tags that are configured to convey item information via a wireless signal include radio frequency identification (RFID) tags and near field communication (NFC) tags.

The description above is presented as a general overview of related art in this field and should not be construed as an admission that any of the information it contains constitutes prior art against the present patent application.

SUMMARY

There is provided, in accordance with an embodiment of the present invention an apparatus, including a display, a sensor configured to capture one or more codes for one or more corresponding components positioned in proximity to the sensor; and a processor configured: (a) to convey the one or more codes to a management system, the management system being a separate entity managing a data storage facility housing the one or more components, (b) to receive, from the management system, an identification and a status of each of the one or more components, (c) to present, on the display, the status of the one or more components and a visual guide to a location of the one or more components and the location of an individual failed subcomponent comprised within the one or more components, wherein the one or more components include at least storage system servers and uninterruptible power supply (UPS) devices, and wherein the individual failed subcomponent comprises a failed hardware device within the one or more components requiring replacement and includes at least one of a storage disk, a memory module, a central processing unit, and a cooling component, and (d) to detect, by the management system, the failed subcomponent comprised in the one or more components via the received status indicating failure of the failed subcomponent; wherein presenting the status comprises presenting one or more icons, each of the icons associated with one of the one or more components, and wherein the one or more icons are displayed based on a distance of the portable device in relation to the one or more components such that when a plurality of the one or more components are in a field of view of the portable device, the plurality of the one or more components are displayed as a plurality of the one or more icons representing each of the plurality of the one or more components, and as the portable device is positioned closer to the displayed plurality of the one or more components, the one or more icons change to display the failed subcomponent within the one or more components.

Additional embodiments are also provided herein and supply related advantages.

BRIEF DESCRIPTION OF THE DRAWINGS

The disclosure is herein described, by way of example only, with reference to the accompanying drawings, wherein:

FIG. 4 is a schematic pictorial illustration of a technician using the portable computing device to diagnose the storage facility;

FIGS. 5A-5C are block diagrams that show a display of the portable computing device used to diagnose the storage facility, in accordance with an embodiment of the present invention.

DETAILED DESCRIPTION OF EMBODIMENTS

Data storage facilities typically comprise multiple storage systems (also referred to herein as storage controllers), wherein each of the storage systems comprises multiple components (e.g., storage devices, network adapters, processors, memory modules etc.). In operation, the storage facility may be managed by a management system that is configured to detect and report any component failures to a technician. Upon arriving at the storage facility and identifying the failed component, the technician can service or replace the failed component.

Embodiments of the present invention provide methods and systems for identifying the failed component. In some embodiments, the technician can use a portable computing device (e.g., a smartphone or a tablet computer) that is configured to capture codes (e.g., QR codes or RFID codes) for components in proximity to the technician. The portable computing device can be configured to identify and determine a status of the components associated with the captured codes, and to present visual feedback (e.g., icons or a heat map) detailing the status of the components.

In addition to enabling a technician to rapidly locate a storage system having a failed component, embodiments of the present invention can assist the technician in correctly identifying the failed component in the storage system. For example, the storage system may comprise two uninterruptible power supplies (UPS), and the management system detects that one of the UPSs has failed. By presenting, on the portable computing device, a visual guide to the storage system, embodiments of the present invention can assist the technician in correctly identifying the failed UPS, since replacing the wrong UPS may result in lost data due to a non-orderly shutdown of the storage system.

While the embodiments described herein relate generally to diagnosing a failed component of a facility comprising multiple clustered storage controllers, it will be understood that embodiments of the present invention may also be used for other types of facilities. For example, the embodiments described herein may be used to identify failed equipment in a cellular phone base transceiver stations comprising antennas, communication transceivers, digital signal processors, control electronics, Global Positioning System (GPS) receivers, backup electrical power sources, cooling systems and fire suppression systems (e.g., Halon fire suppression systems).

Figure 1:
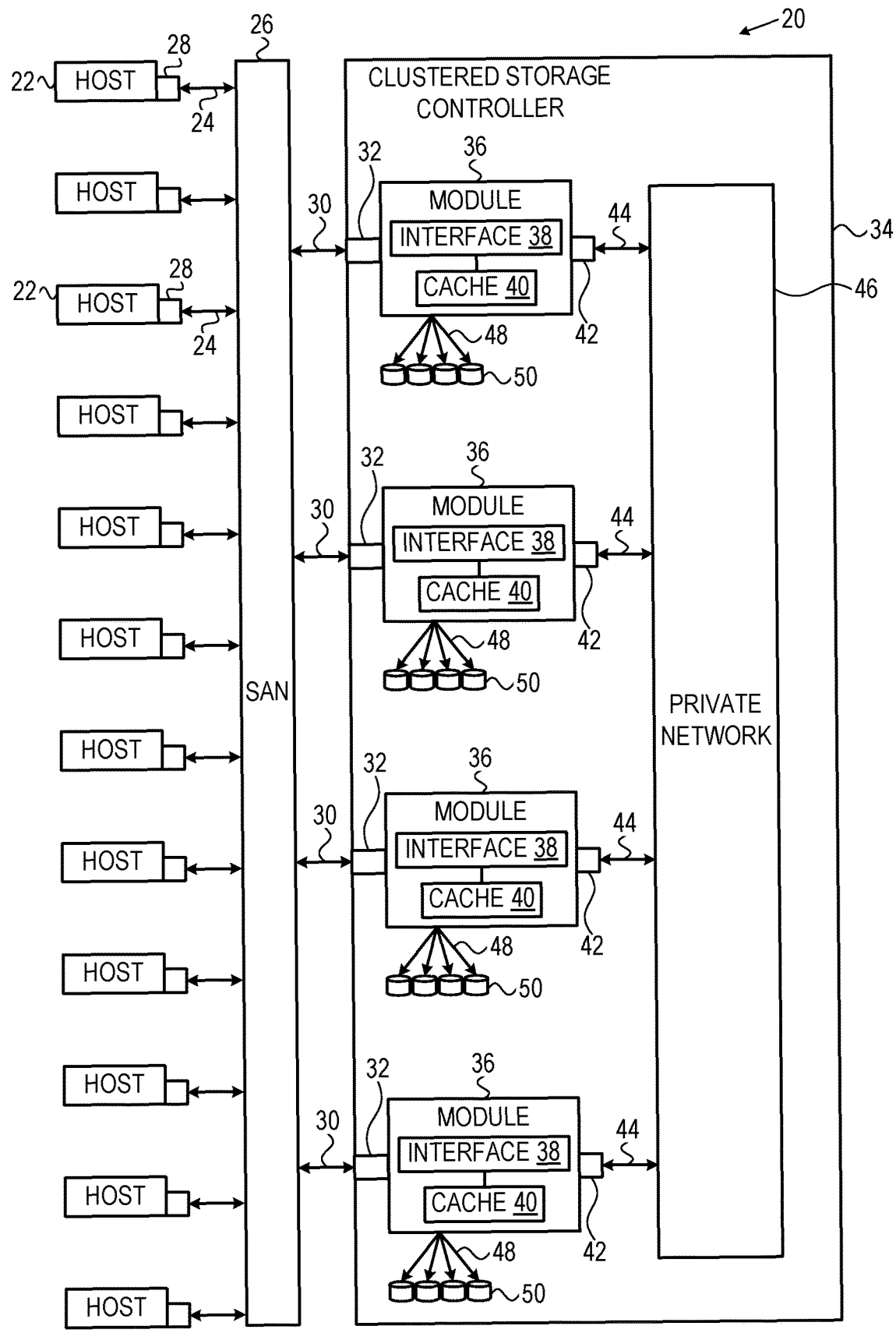
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Examples of adapters 32 and 42 include switched fabric adapters such as Fibre Channel (FC) adapters, Internet Small Computer System Interface (iSCSI) adapters, Fibre Channel over Ethernet (FCoE) adapters and Infiniband™ adapters.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the functions/actions specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/actions specified in the flowchart and/or block diagram block or blocks.

On-Site Component Diagnosis

Figure 2:
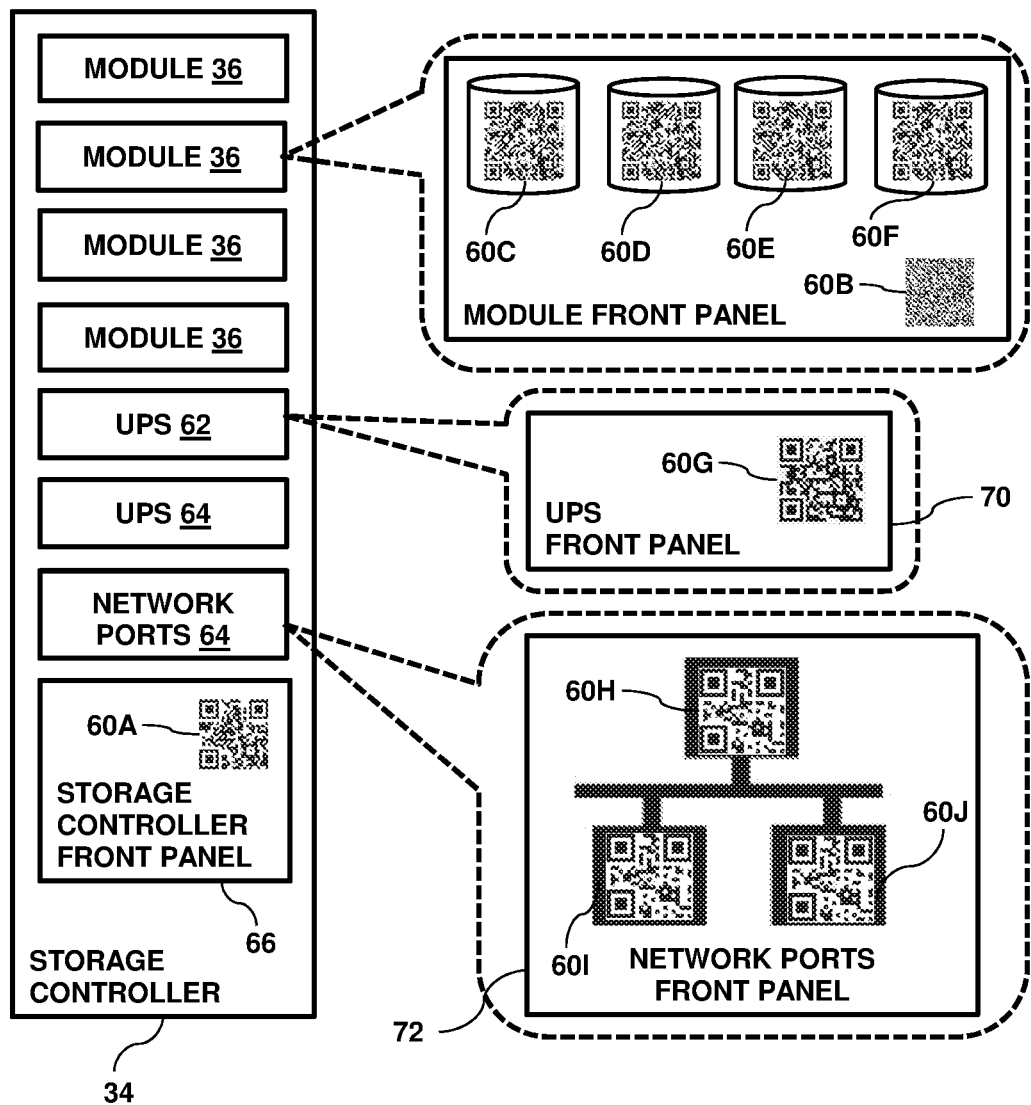
FIG. 2 is a block diagram of a storage controller whose components can be identified by Quick Response (QR) codes, in accordance with an embodiment of the present invention.

FIG. 2 is a block diagram of storage controller 34 comprising QR code stickers 60 to identify the storage controller and each of its components, in accordance with an embodiment of the present invention. In the example shown in FIG. 2, storage controller 34 and each of its modules and components may be identified by a QR-Code 60, and in the description herein, QR codes 60 may be differentiated by appending a letter to the identifying numeral, so that QR codes 60 comprise QR codes 60A-60J. Alternatively, a given QR code 60 may just be referred to QR code 60.

In addition to the components described in FIG. 1, storage controller 34 comprises a pair of uninterruptable power supplies (UPS) 62, and network ports 64 that couple adapter 32 to data connection 30. In the embodiments herein, storage controller 34 and its components may also be referred to as components or subcomponents. For example, modules 36 may be referred to as components or subcomponents of storage controller 34, and storage devices 50 may be referred to as components or subcomponents of a given module 36.

In the example shown in FIG. 2, storage controller 34 can be identified by a QR code 60A affixed to a front panel 66 of the storage controller, and each module 36 can be identified by a QR code 60B affixed to a front panel 68 of the module. Additionally, QR codes 60C, 60D, 60E and 60F are affixed to front panel 68, representing the four storage devices 50 coupled to module 36 via data connection 48. Each of the UPSs can be identified by a QR code 60G affixed to a front panel 70 of the UPS, and each of the network ports can be identified by QR codes 60H, 60I and 60J affixes to a network ports panel 72.

In some embodiments, each QR code 60 associated with storage controller 34 and its components may have similar dimensions. In alternative embodiments, the QR codes affixed to the storage controller and the components may have different dimensions. For example, QR code 60A may have larger dimensions than QR code 60B, thereby enabling QR code 60A to be identified at greater distances. Likewise, QR code 60B may have larger dimensions than QR codes 60C-60F (i.e., for storage devices 50 that are subcomponents of module 36).

While the embodiments herein describe identifying storage controller 34 and its components using QR codes 60, other methods of identification are considered to be within the spirit and scope of the present invention. For example, other types of optically readable identifiers, such as barcode stickers, may be affixed to storage controller 34 and its components.

Alternatively, storage controller 34 and its components may be identified by wireless signals conveyed by transmitters positioned in proximity to the storage controller and its components. For example, transmitters such as near field communication (NFC) tags or radio frequency identification (RFID) tags may be used to identify storage controller 34 and its components.

Figure 3:
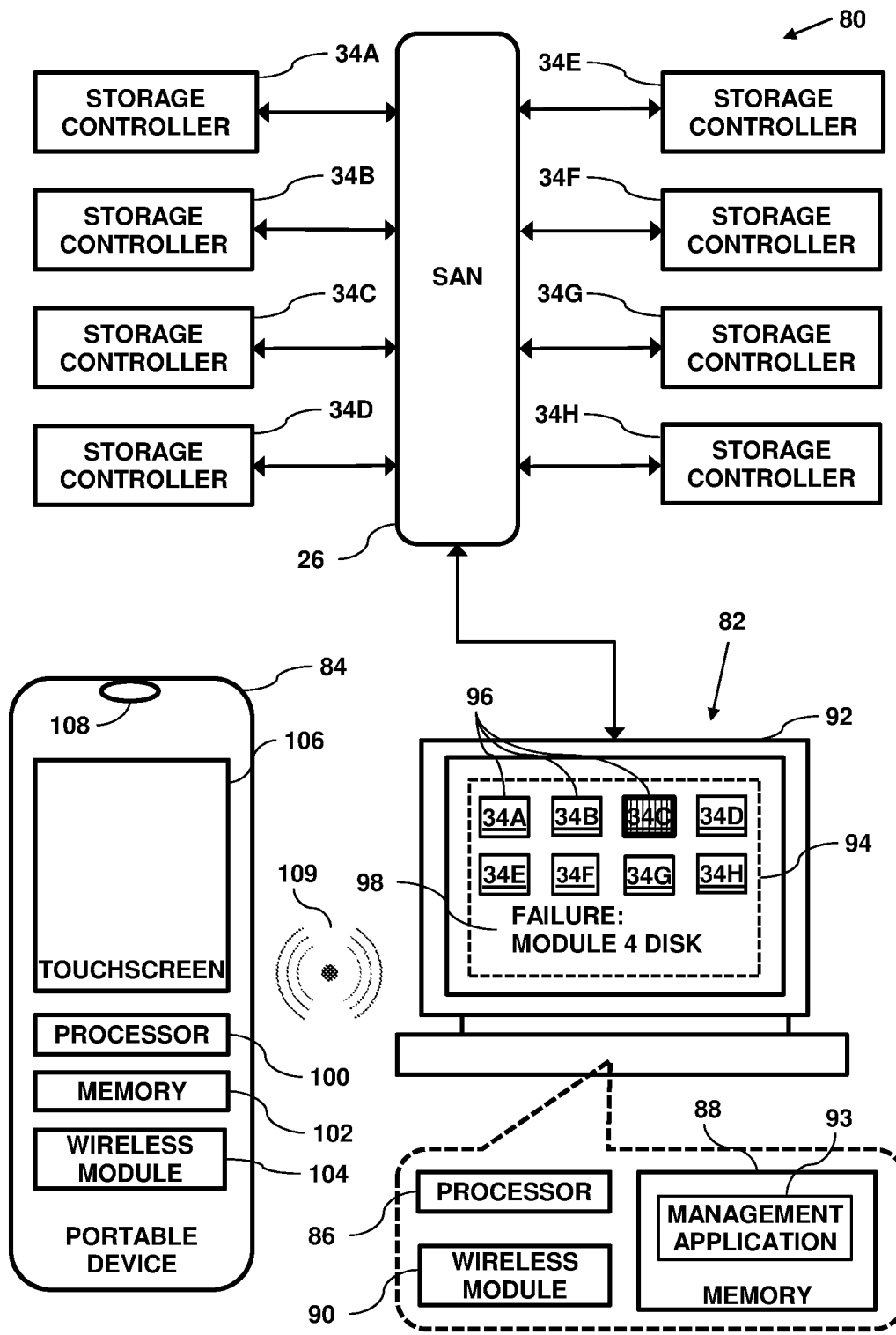
FIG. 3 is a block diagram of a management system and a portable computing device configured to manage a facility comprising multiple storage controllers, in accordance with an embodiment of the present invention.

FIG. 3 is a block diagram of a facility 80 comprising multiple storage controllers 34 managed by a management system 82 and a portable computing device 84, in accordance with an embodiment of the present invention. In the description herein, storage controllers 34 may be differentiated by appending a letter to the identifying numeral, so that storage controllers 34 comprise storage controllers 34A-34H. Alternatively, a given storage controller 34 may just be referred to as storage controller 34.

Management system 82 comprises a processor 86, a memory 88, a wireless communication module 90 and a display 92. In operation, processor 86 executes a management application 93 that monitors the storage controllers of facility 80, and presents a status 94 of the facility on display 92. Management application 93 may include a database that associates each QR code 60 with a corresponding storage controller 34 or one of the storage controller's components.

In some embodiments, status 94 may comprise icons 96 representing each of the storage controllers in the facility and a message 98 that details any component failures. In the example shown in FIG. 3, processor 86 highlights a given icon 96 representing storage controller 34C, and presents message 98 indicating that the second storage device 50 in the fourth module 36 (i.e., of storage controller 34C) has failed.

Portable computing device 84 comprises a processor 100, a memory 102, a wireless module 104, a display such as a touchscreen 106, and a sensor 108. To read QR codes 60, sensor 108 may comprise an optical sensor. In the configuration shown in FIG. 3, portable computing device 84 is configured to communicate with management system 82 via wireless connection 109.

Examples of portable computing devices 84 include, but are not limited to smartphones and tablet computers. In some embodiments, portable computing device 84 may be configured to execute management application 93 locally on processor 100. In embodiments where storage controllers 34 and their components are identified by wireless signals from RFID of NFC tags, processor 100 may be configured to identify the components based on wireless signals received by wireless module 104.

Processors 86 and 100 typically comprise general-purpose central processing units (CPU), which are programmed in software to carry out the functions described herein. The software may be downloaded to management system 82 and portable computing device 84 in electronic form, over a network, for example, or it may be provided on non-transitory tangible media, such as optical, magnetic or electronic memory media. Alternatively, some or all of the functions of processors 86 and 100 may be carried out by dedicated or programmable digital hardware components, or using a combination of hardware and software elements.

FIG. 4 is a schematic pictorial illustration of a technician 110 positioning portable computing device 84 in proximity to the storage controller in facility 80, so that storage controllers 36B, 36C and 36D are within a field of view 112 of optical sensor 108. Continuing the example shown in FIG. 3, management system 82 has detected a failure of a given storage device 50 in storage controller 34C

FIGS. 5A-5C are block diagrams showing icons presented on touchscreen 106 that indicate a status of storage controllers 34 and their respective components, in accordance with an embodiment of the present invention. Continuing the example shown in FIGS. 2 and 3, technician 110 has positioned portable computing device 84 so that storage controllers 36B, 36C and 36D are within a field of view 112 of optical sensor 108.

In FIG. 5A, processor 100 presents, on touchscreen 106, icons 120, 122 and 124 representing storage controllers 34B, 34C and 34D (i.e., the storage controllers within field of view 112). As shown in the Figure, processor 100 highlights icon 122, thereby conveying visual feedback to technician 100 indicating a failed component in storage controller 34C.

Upon technician 110 pressing icon 122, processor 100 may be configured to present information on subcomponents of storage controller 24C on touchscreen 106. In the example shown in FIG. 5B, processor 100 presents icons 126, 128, 130 and 132 representing each module 36, icons 134 and 136 representing each UPS 62 and icon 138 representing network ports 64. As shown in the Figure, processor 100 highlights icon 132, thereby conveying visual feedback to technician 100 indicating a failed component in the fourth module 36 of storage controller 36C.

Upon technician 110 pressing icon 132, processor 100 may be configured to present information on subcomponents of the fourth module of storage controller 36C on touchscreen 106. In the example shown in FIG. 5C, processor 100 presents icons 140, 142, 144 and 146 representing each storage device 50 in the fourth module 36. As shown in the Figure, processor 100 highlights icon 142, thereby conveying visual feedback to technician 100 indicating a failure of the second storage device 50 in the fourth module 36 of storage controller 36C. In some embodiments, processor 100 can present information on the failed storage device, in response to receiving a signal indicating that technician 110 has pressed on icon 142 on the touchscreen.

In alternative embodiments, processor 100 can present the icons described hereinabove based on a distance between technician 110 and storage controllers 34. At greater distances where multiple storage controllers 34 are within field of view 112, processor 100 can present the multiple storage controllers as shown in FIG. 5A. As technician 110 identifies and moves closer to a given storage controller 34 having a failed component, processor 100 can responsively present the components of the given storage controller as shown in FIGS. 5B and 5C, thereby enabling technician 110 to drill down and "zero in" on the failed component.

While the configuration in FIGS. 5A-5C shows processor highlighting a given icon representing a failed component or a component having a failed subcomponent, other visual feedback presented to technician 110 is considered to be within the spirit and scope of the present invention. For example, processor 100 may present the status of facility 80 as a heat map on touchscreen 106.

In the heat map, processor 100 may present a specific color indicating a failed component. For example, processor 100 may present a red region indicating a physical location of a failed component. In some embodiments, processor can present a yellow region surrounding the red region and a green region surrounding the yellow region, thereby conveying a visual reference to assist technician 110 in locating the failed component.

In some embodiments, as technician 110 moves portable computing device toward the red region, processor 100 can present a message (similar to message 98) on touchscreen 106 identifying the failed component. In alternative embodiments, processor 100 can present information on the failed component in response to receiving a signal indicating that technician 110 has pressed the red region on touchscreen 106.

Figure 6:
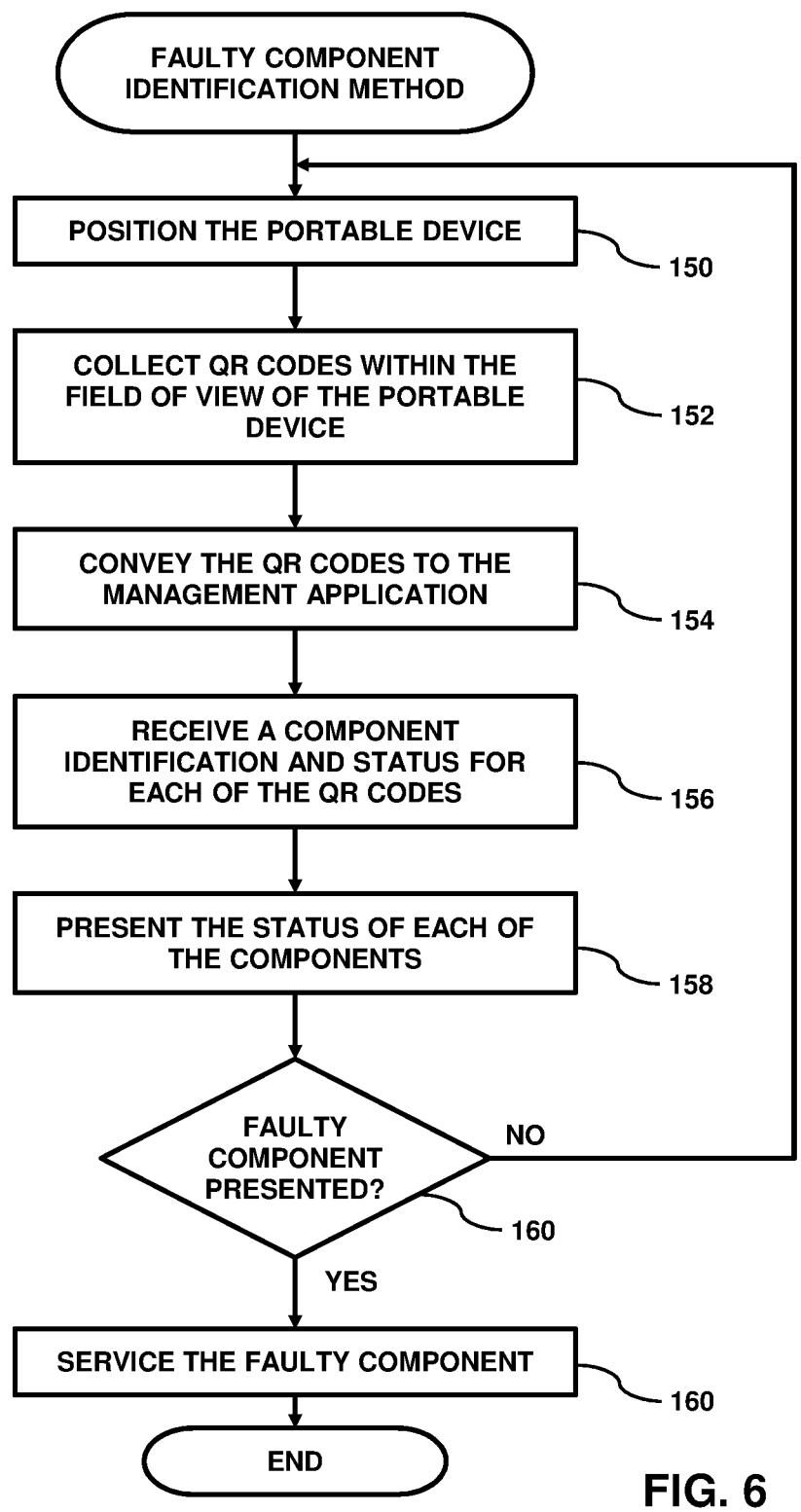
FIG. 6 is a flow diagram that schematically illustrates a method of identifying a faulty component in the storage facility, in accordance with an embodiment of the present invention.

FIG. 6 is a flow diagram that schematically illustrates a method of using portable computing device 84 to locate a faulty component in facility 80, in accordance with an embodiment of the present invention. In a positioning step 150, technician 110 positions portable computing device 84 in proximity to one or more storage controllers 34, and in a collection step 152, processor 100 receives a signal from sensor 108, thereby collecting QR codes 60 within field of view 112.

In a convey step 154, processor 100 conveys the collected QR codes to management system 82 via wireless connection 109. Upon receiving the conveyed QR codes, processor 86 identifies components and subcomponents associated with the conveyed QR codes, and conveys, to portable computing device 84, the identification and a status for each of the components and subcomponents referenced by the received QR codes.

In a receive step 156, processor 100 receives the identification and the status for each of the components and subcomponents referenced by the conveyed QR codes, and in a presentation step 158, the processor presents the received statuses on touchscreen 106. As described supra, processor 100 may present the statuses as icons or as a heat map.

In a comparison step 160, if processor 100 presents the faulty component on touchscreen 106, then in a servicing step 162, the technician can identify and service (e.g., replace) the faulty component, and the method ends. If processor 100 does not present the faulty component on touchscreen 106, then technician 110 is promoted to reposition portable computing device 84, and the method returns to step 150.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An apparatus, comprising:
a display;
a sensor configured to capture one or more codes for one or more corresponding components positioned in proximity to the sensor; and
a processor configured:
to convey the one or more codes to a management system, the management system being a separate entity managing a data storage facility housing the one or more components,
to receive, from the management system, an identification and a status of each of the one or more components,
to present, on the display, the status of the one or more components and a visual guide to a location of the one or more components and the location of an individual failed subcomponent comprised within the one or more components, wherein the one or more components include at least storage system servers and uninterruptible power supply (UPS) devices, and wherein the individual failed subcomponent comprises a failed hardware device within the one or more components requiring replacement and includes at least one of a storage disk, a memory module, a central processing unit, and a cooling component, and
to detect, by the management system, the failed subcomponent comprised in the one or more components via the received status indicating failure of the failed subcomponent; wherein presenting the status comprises presenting one or more icons, each of the icons associated with one of the one or more components, and wherein the one or more icons are displayed based on a distance of the portable device in relation to the one or more components such that when a plurality of the one or more components are in a field of view of the portable device, the plurality of the one or more components are displayed as a plurality of the one or more icons representing each of the plurality of the one or more components, and as the portable device is positioned closer to the displayed plurality of the one or more components, the one or more icons change to display the failed subcomponent within the one or more components.

2. The apparatus according to claim 1, wherein the one or more codes comprise one or more wireless signals conveyed by one or more transmitters positioned in proximity to the one or more components, and wherein capturing the one or more codes comprises receiving the one or more wireless signals.

3. The apparatus according to claim 1, wherein the processor is configured to select the one or more transmitters from a list comprising radio frequency identification (RFID) tags and near field communication (NFC) tags.

4. The apparatus according to claim 1, wherein the processor is configured to present the status by presenting a heat map having a specific color highlighting the failed subcomponent.

5. The apparatus according to claim 1, wherein the processor is configured to highlight the icon associated with the failed subcomponent.

6. The apparatus according to claim 1, wherein the processor is configured to present information on the failed subcomponent in response to receiving a signal indicating a selection of the icon associated with the failed subcomponent.

7. The apparatus according to claim 1, wherein the components further include network ports, cooling systems, fire suppression systems, antennas, communication transceivers, digital signal processors, control electronics and Global Positioning System (GPS) receivers.

8. A computer program product, the computer program product comprising:
   a non-transitory computer readable storage medium having computer readable program code embodied therewith, the computer readable program code comprising:
   computer readable program code executing on a portable computing device having a display and configured to capture one or more codes for one or more corresponding components positioned in proximity to the portable computing device;
   computer readable program code configured to convey the one or more codes to a management system, the management system being a separate entity managing a data storage facility housing the one or more components;
   computer readable program code configured to receive, from the management system, an identification and a status of each of the one or more components;
   computer readable program code configured to present, on the display, the status of the one or more components and a visual guide to a location of the one or more components and the location of an individual failed subcomponent comprised within the one or more components, wherein the one or more components include at least storage system servers and uninterruptible power supply (UPS) devices, and wherein the individual failed subcomponent comprises a failed hardware device within the one or more components requiring replacement and includes at least one of a storage disk, a memory module, a central processing unit, and a cooling component; and
   computer readable program code configured to detect, by the management system, the failed subcomponent comprised in the one or more components via the received status indicating failure of the failed subcomponent; wherein presenting the status comprises presenting one or more icons, each of the icons associated with one of the one or more components, and wherein the one or more icons are displayed based on a distance of the portable device in relation to the one or more components such that when a plurality of the one or more components are in a field of view of the portable device, the plurality of the one or more components are displayed as a plurality of the one or more icons representing each of the plurality of the one or more components, and as the portable device is positioned closer to the displayed plurality of the one or more components, the one or more icons change to display the failed subcomponent within the one or more components.

9. The computer program product according to claim 8, wherein the one or more codes comprise one or more wireless signals conveyed by one or more transmitters positioned in proximity to the one or more components, and wherein capturing the one or more codes comprises receiving the one or more wireless signals.

10. The computer program product according to claim 8, further including computer readable program code configured to select the one or more transmitters from a list comprising radio frequency identification (RFID) tags and near field communication (NFC) tags.

11. The computer program product according to claim 8, further including computer readable program code configured to present the status by presenting a heat map having a specific color highlighting the failed subcomponent.

12. The computer program product according to claim 8, further including computer readable program code configured to highlight the icon associated with the failed subcomponent.

13. The computer program product according to claim 8, further including computer readable program code configured to present information on the failed subcomponent in response to receiving a signal indicating a selection of the icon associated with the failed subcomponent.

14. The computer program product according to claim 8, wherein the components further include network ports, cooling systems, fire suppression systems, antennas, communication transceivers, digital signal processors, control electronics and Global Positioning System (GPS) receivers.

* * * * *